United States Patent [19]

Foley et al.

[11] Patent Number: 5,054,560
[45] Date of Patent: Oct. 8, 1991

[54] TRANSPORTING CASTER WHEELS

[75] Inventors: Daniel M. Foley, Des Moines; Vernon E. Rettig, Bondurant, both of Iowa

[73] Assignee: Deere & Company, Moline, Ill.

[21] Appl. No.: 564,015

[22] Filed: Aug. 7, 1990

[51] Int. Cl.⁵ .............................................. A01B 73/00
[52] U.S. Cl. .................................. 172/248; 172/313; 172/386; 172/677; 172/1
[58] Field of Search ............... 172/248, 245, 310, 313, 172/311, 383, 386, 677; 280/411.1

[56] References Cited

U.S. PATENT DOCUMENTS

| | | | |
|---|---|---|---|
| 4,083,411 | 4/1978 | Van Der Lely | 172/248 X |
| 4,119,329 | 10/1978 | Smith | 172/248 X |
| 4,127,283 | 11/1978 | Baden | 172/248 |
| 4,396,069 | 8/1983 | Ferber et al. | 172/310 |
| 4,410,194 | 10/1983 | Steilen | 172/386 X |
| 4,821,811 | 4/1989 | Swenson | 172/248 |

*Primary Examiner*—David H. Corbin
*Assistant Examiner*—Jeffrey L. Thompson

[57] ABSTRACT

Lift arms on a gang of implements support transport wheels which are movable from a raised field-working position to a lowered endwise towing position. Several of the wheels at the forward and aft ends of the towed gang of implements are fitted with castering pivots located adjacent the wheel hubs close to the wheel centerlines to lessen side loading and tire scuffing during turns. The castering wheels include a caster control assembly having at least four functions. First, a lock feature includes a spring-biased pin selectively engageable with the control assembly to secure the wheels in an in-line position to permit easy backing of the implements in the towing configuration. Second, a contact on the implement frame which engages the caster control assembly when the wheels are raised off the ground, cams the caster wheel to a preselected field-working position and prevents rocking of the wheel. Third, a bellevue washer on the caster control assembly limits shimmying of the wheel during transport. Fourth, the caster control assembly cooperates with a stop member on the lift arm to limit the angle through which the wheel can pivot. Combinations of caster wheel and non-caster wheel lift arm arrangements to reduce side loads and wheel scuffing while providing towing stability include two forwardmost caster wheels with all remaining wheels uncastered when three and four implements are towed endwise. When five or more implements are towed endwise, the first two wheels and the last wheel are castered, with an additional central caster wheel provided on a six-unit arrangement.

19 Claims, 5 Drawing Sheets

TRANSPORTING CASTER WHEELS

BACKGROUND OF THE INVENTION

1. Field of the Invention

The present invention relates generally to a multiple implement towing arrangement and, more specifically, to caster wheel structure for such a towing arrangement.

2. Related Art

Multiple implement hitches of the type shown in U.S. Pat. No. 4,260,172 utilize a series of lift legs mounted at the rear of the implements and supporting in-line transport wheels having fore-and-aft extending axes of rotation for endwise towing. High side loading often is experienced by the lift legs and tires during turns, especially when four or more of the implements are ganged for towing, and excessive tire scuffing and tire wear result.

Some endwise transport systems use caster wheels at both the front and rear of the towed gang. Although the caster wheels help reduce the high side loads, some instability may be introduced which can make transport more difficult. Locking of the caster wheels in an in-line position is advantageous for stability at times such as during backing of the implements in the endwise position. A caster brake or other shimmy reducing device is required to prevent wheel oscillation during transport.

Another problem encountered with some endwise transport systems which utilize caster wheels involves firmly supporting the wheels when they are raised for normal field operations so that unwanted rocking is prevented. For example, on grain drill endwise transport systems, the caster wheels are typically located adjacent a platform by the grain hoppers so that it is necessary to secure the wheels against castering. Some systems utilize a pin arrangement which can be difficult and time consuming to use.

BRIEF SUMMARY OF THE INVENTION

It is therefore an object of the present invention to provide an improved transport arrangement for towing multiple implements in endwise fashion.

It is another object to provide a method of equipping endwise transport systems with a combination of castering and non-castering transport wheel assemblies wherein, without sacrificing transport stability, side loading during turns is significantly reduced over at least most previously available endwise transport arrangements.

It is another object of the present invention to provide an improved transport arrangement for endwise towing of implements which advantageously utilizes caster wheels. It is another object to provide such an arrangement having a specific combination of transport wheels with selectively lockable and releasible castering for better transport and backing capabilities.

It is a further object of the present invention to provide an improved caster wheel structure for an implement transport. It is yet another object to provide such a caster wheel structure having an improved castering pivot. It is another object to provide such a structure with a selective lock-in feature. It is still a further object to provide such a caster wheel structure which can be easily locked during transport and secured against castering automatically when raised to the field-working position. It is yet another object to provide a structure which having an improved feature for preventing caster wheel shimmy.

In accordance with the above objects, a series of lift legs at the rear of a gang of implements support transport wheels which are movable from a raised field-working position to a lowered endwise towing position. One or two of the wheels at the forward end and, in ganged arrangements of five or more implements, one aft wheel are fitted with castering pivots located close to the wheel centerlines to lessen side loading and tire scuffing during turns. The uncastered center implement transport wheels associated with at least three of the implements in ganged arrangements of five or more implements, and the uncastered wheels associated with the trailing implements in smaller gang arrangements, lend stability to the towed gangs while castering the two forwardmost wheels significantly reduces unwanted side loading.

A lock feature including a spring-loaded pin and a pivoting plate structure selectively secures the caster wheels in an in-line position to permit easy backing of the implements in the towing configuration. A bracket on the implement frame contacts the pivoting plate to cam the caster wheel to a preselected position and limit castering when the wheel is lifted to the field-working position. When the wheel is lowered to the transport position, the wheel is automatically freed for normal castering. Caster limiting stop action and transport wheel shimmy reduction are also advantageously provided by the pivoting plate structure.

These and other objects, features and advantages of the present invention will become apparent to one skilled in the art upon reading the following detailed description in view of the drawings.

DETAILED DESCRIPTION OF THE DRAWINGS

Figure 1:
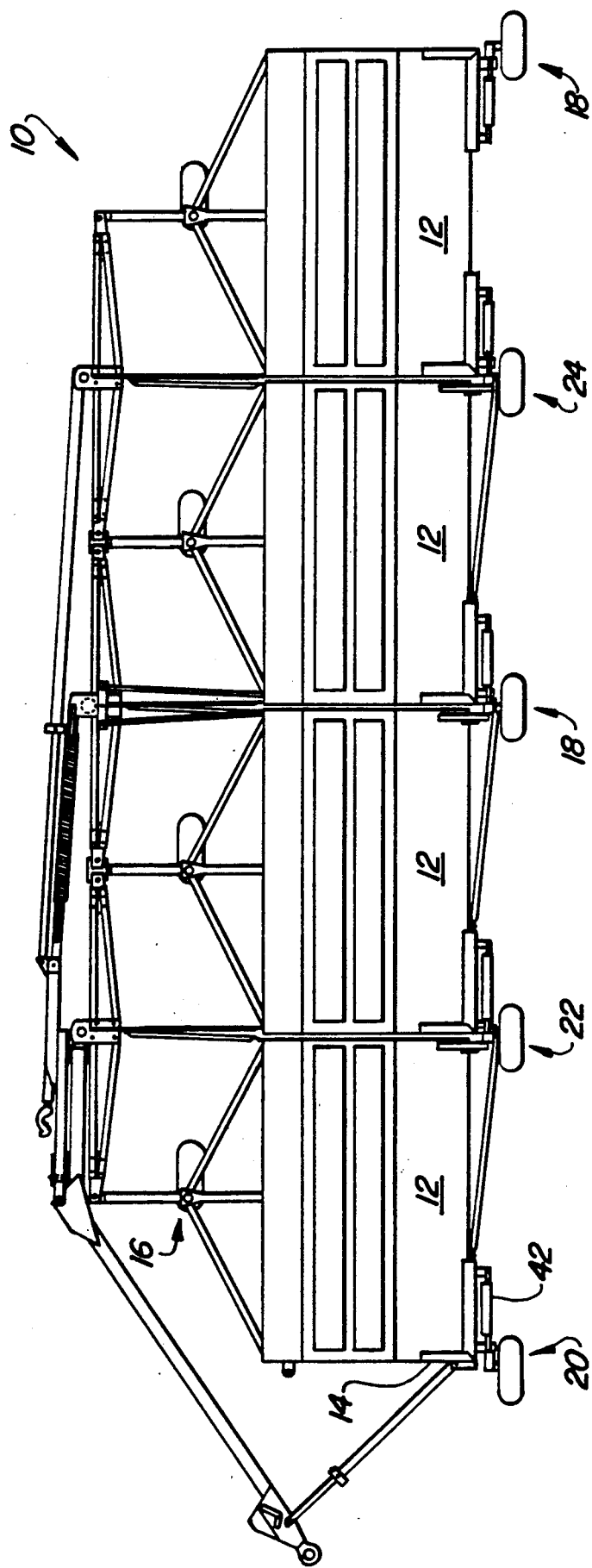
FIG. 1 is a view of a multiple implement hitch and showing four grain drills connected for towing endwise in a transport position with the transport wheels in the lowered transport position.

Referring now to FIG. 1, therein is shown a wide agricultural implement 10 including a plurality of units such as grain drills 12 with frames 14 connected to an implement hitch 16 for selectively towing the drills 12 side-by-side in the field or in endwise fashion for narrow transport. For further information on the general hitch structure, reference may be had to the aforementioned U.S. Pat. No. 4,260,172. It is to be understood, however, that the caster wheel arrangement described below may be used with other types of endwise hitch structures.

The implement 10 includes a plurality of lift wheel assemblies 18, 20, 22 and 24 located adjacent the aft corners of the drills 12 for raising and lowering the implement 10 between transport and field-working positions. The assemblies 20 and 22 are adapted for mounting on rear left-hand and right-hand corners, respectively, of selected drill frames 14 (FIG. 6) and include wheels which caster. The assemblies 18 and 24 are non-castering and are adapted for mounting on right-hand and left-hand corners, respectively, of selected drill frames 14. The preferred arrangement of the assemblies 18-24 is shown in FIG. 6 and is discussed in detail below.

The caster wheel assemblies 20 and 22 are of similar construction so only the left-hand assembly 20 (FIG. 2) will be described in detail. A lift arm 36 is connected at its upper end by a pivot 38 to the frame 14 for rocking about fore-and-aft extending axes between an upper field-working position (FIGS. 3 and 6) and a lowered transport position (FIGS. 1 and 2) by a lift cylinders 42. The base end of the lift cylinder 42 is connected to the frame 14 by a bracket 44. The rod end of the cylinder 42 is pinned to the upper end of a rock arm 46 fixed to the upper end of the lift arm 36 above the pivot 38.

Figure 2:
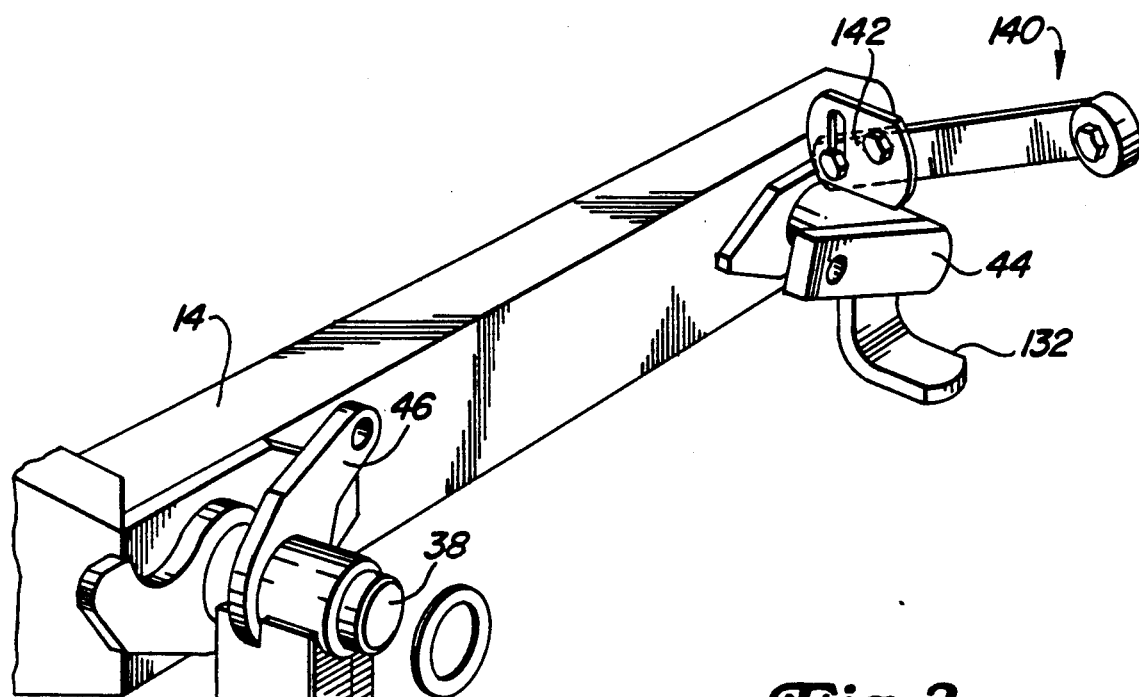
FIG. 2 is an exploded view of a lift wheel assembly utilized with the hitch of FIG. 1 and showing the castering structure of the present invention.
Figure 2:
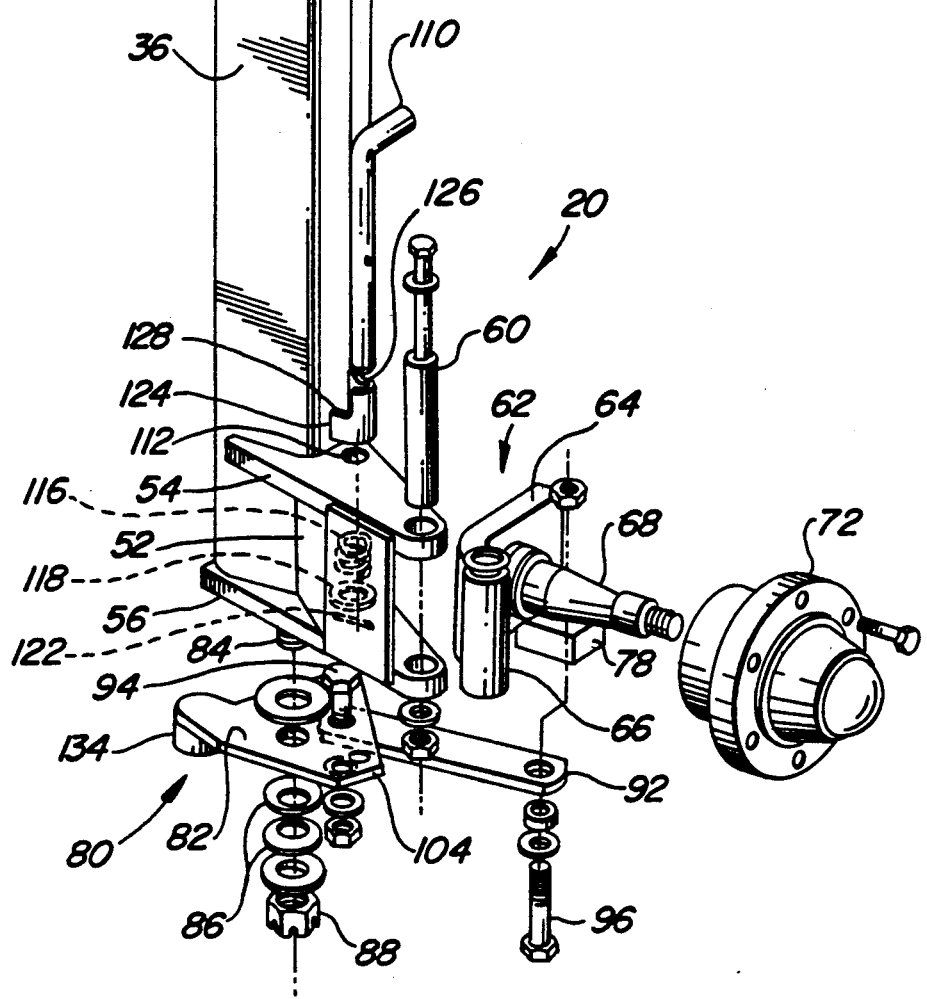
Figure 4:
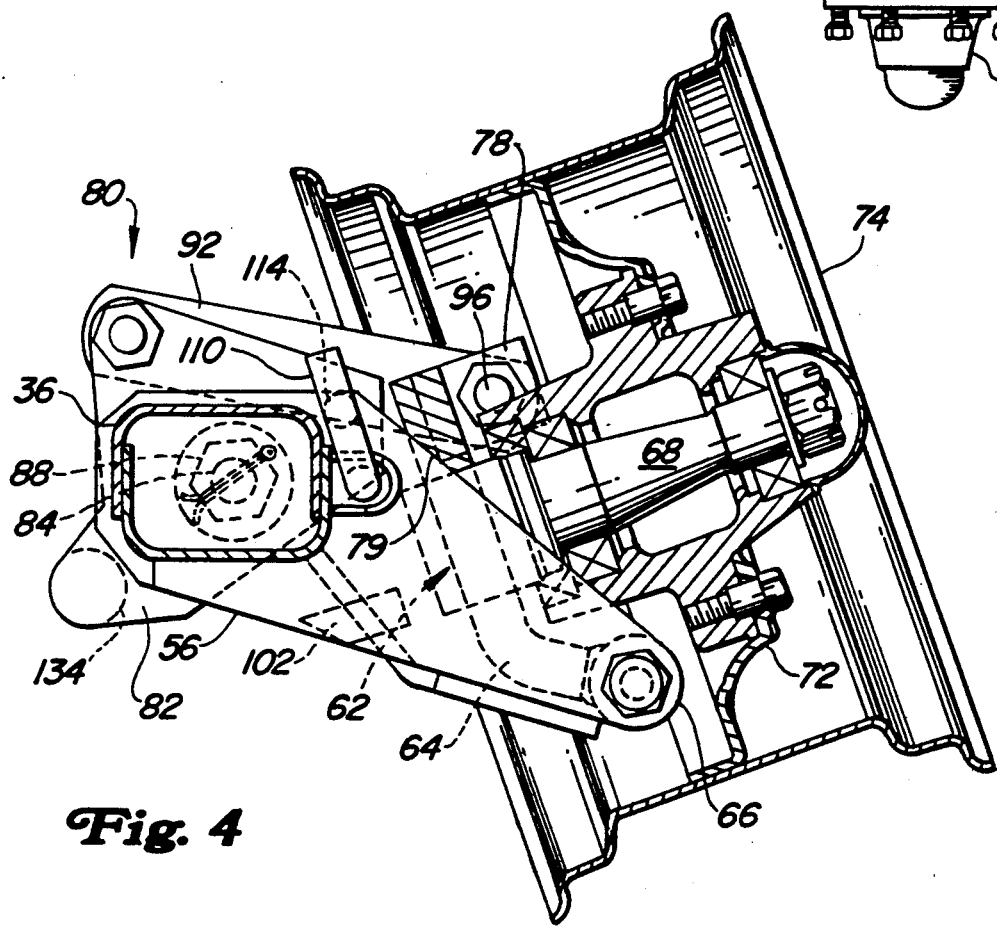
FIG. 4 is a top view of the castering structure showing the wheel turned in a first direction to the limit position.

A wheel support bracket 52 is fixed to the lower end of the arm 36 and includes upper and lower spaced supports 54 and 56 having outer vertically aligned apertures for receiving an upright pivot pin 60. A wheel spindle support 62 is pivotally connected between the supports 54 and 56 by the pin 60 for rocking about an axis generally parallel to the longitudinal axis of the arm 36. The spindle support 62 includes an upright plate 64 extending rearwardly and outwardly (as shown in FIG. 2) from a pivot bearing 66 which receives the pin 60. A wheel spindle projects perpendicularly from the plate 64 and rotatably supports a wheel hub 72. A wheel 74 is bolted to the hub 72. A block 78 is welded to the lower edge of the plate 64 and acts as a caster limit, contacting the lower support 56 at location 79 (FIG. 4) when the wheel casters to the left-most position. The wheel spindle support arrangement provides a compact structure which positions the wheel centerline closely adjacent the axis of the arm 36 for reduced arm loading.

A multi-function caster control assembly indicated generally at 80 in FIG. 2 is pivotally connected to the lower end of the arm 36 and includes a flat, somewhat triangularly shaped plate 82 pivotally connected to a threaded stud 84 projecting downwardly from the lower support 56. Two Bellville washers 86 are positioned over the stud 84 and sandwiched between a castle nut 86 and the plate 82. A drag link 92 includes a first end pivotally connected to one corner of the plate 82 by a bolt 94 and an opposite end pivotally connected to the block 78 by a bolt 96. As the wheel spindle support 62 pivots about the axis of the pin 60, the drag link 92 causes the plate 82 to pivot in the same direction about the axis of the stud 84. The nut 88 is tightened so that the Bellville washers 86 provide enough resistance to plate pivoting to eliminate caster wheel oscillations or shimmy during transport and yet permit the wheel to caster during turns to reduce side loads and tire scuffing.

The caster control assembly 80 not only functions to control wheel oscillations, but it also provides caster limit and caster lock functions. In addition, the assembly 80 automatically controls wheel position upon rocking of the arm 36 upward to the field-working position of FIG. 3, thus limiting caster and assuring proper positioning of the tire against a stop.

Figure 5:
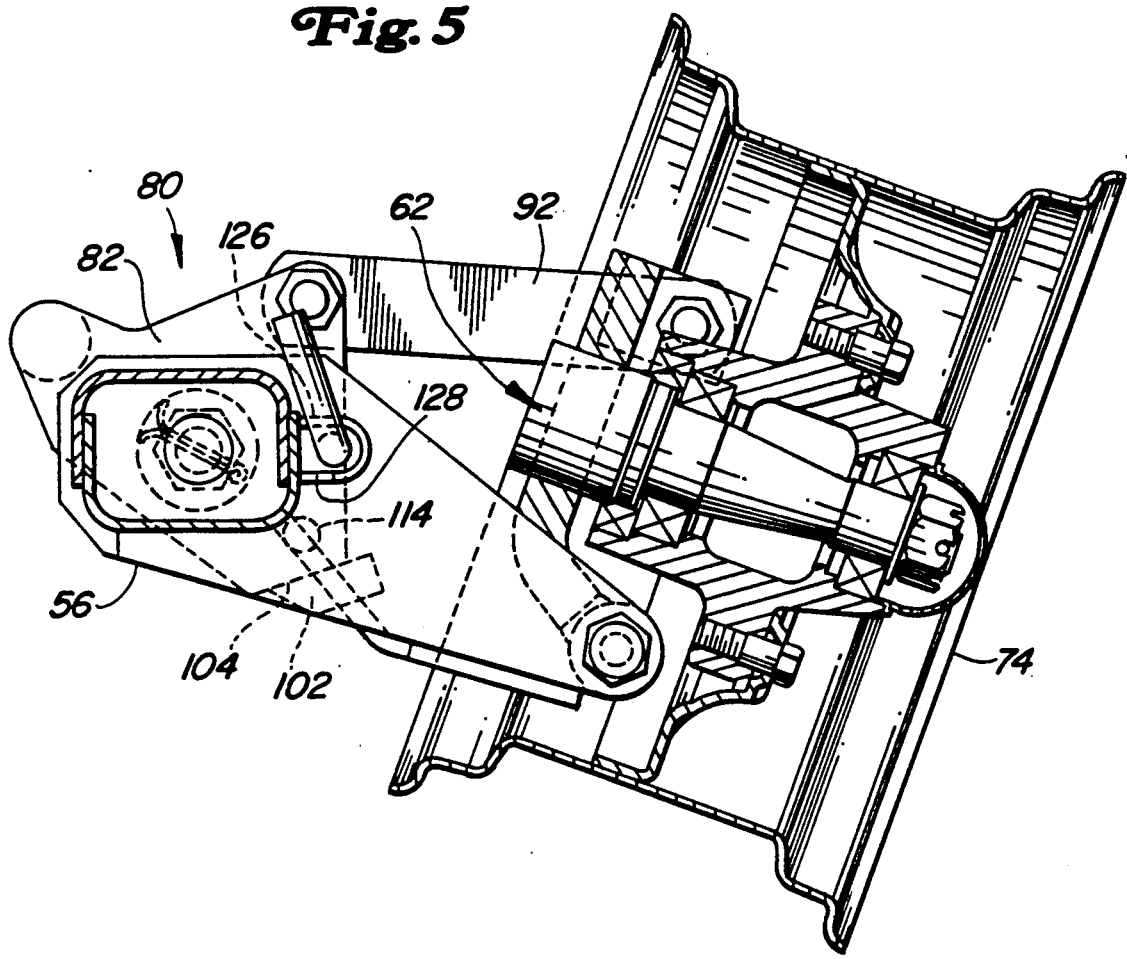
FIG. 5 is a view similar to FIG. 4 but showing the wheel turned opposite limit position.
Figure 6A:
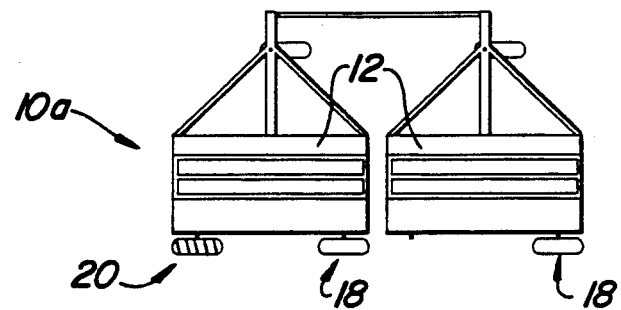
FIG. 6a–6d are schematic representations illustrating the caster wheel arrangement for towed gangs having two through five implements, respectively, and showing the wheels in the raised field-working positions.
Figure 6B:
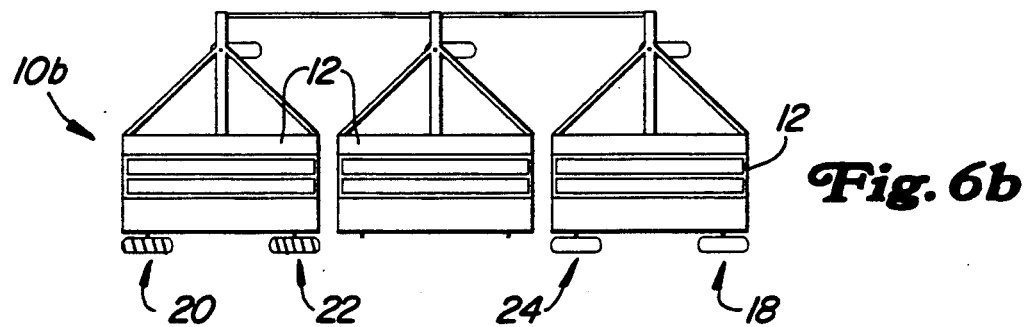
Figure 6C:
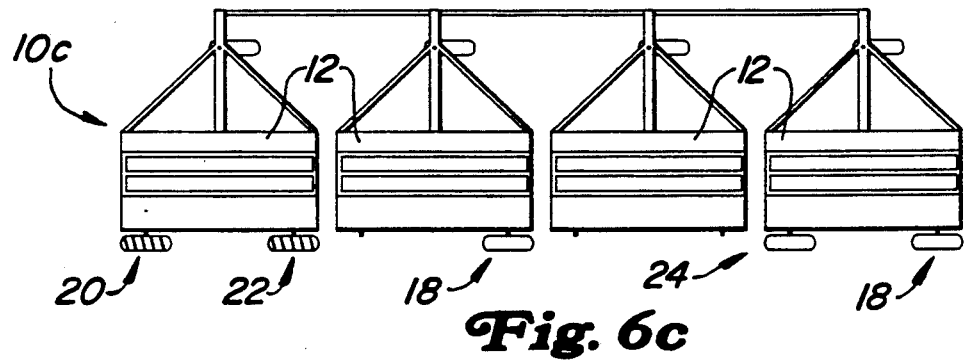
Figure 6D:
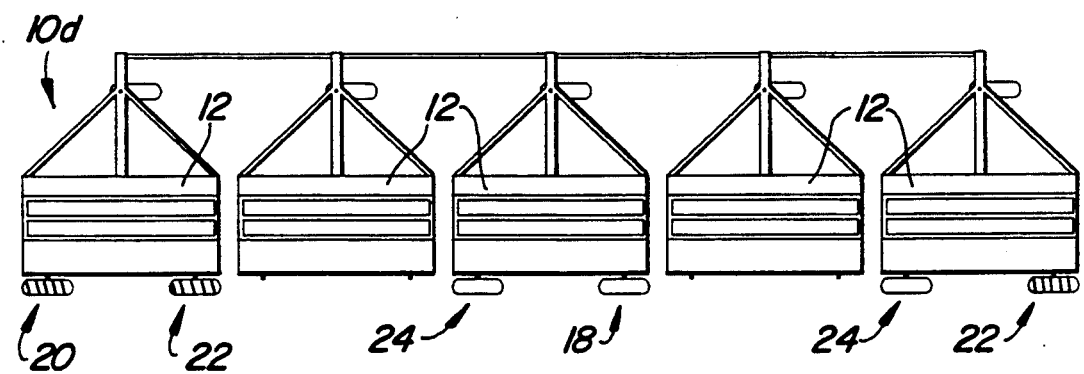

A caster limiting stop block 102 (FIG. 5) is welded to the underside of the support plate 56 in the path of a forward edge 104 of the pivoting plate 82. As the wheel 74 rocks in the clockwise direction (as viewed in FIG. 5), the drag link 92 causes the plate 82 to pivot, also in the clockwise direction, until the plate edge 104 contacts the stop block 102 and prevents further rocking of the wheel.

Caster lock function is provided by a pin 110 which extends through apertures 112 in the support plates 54 and 56, and which is releasible to a position wherein the lower pin end projects through a hole 114 (FIGS. 4 and 5) in the plate 82 which aligns with the pin 110 when the wheel 74 is positioned for endwise transport (i.e., the wheel axis is perpendicular to the endwise towing direction). The pin 110 is biased downwardly by a spring 116 compressed between the upper support plate 54 and washer 118 (FIG. 2) supported on the shank of the pin 110 by a pin 122. A pin keeper 124 secured to the leg 36 has a shallow notch 126 which receives the handle of the pin 110 and maintains the pin end above the level of the plate 82 so that the wheel can caster. A second deeper notch 128 permits the pin 110, when rotated about 180° from the position shown in FIGS. 4 and 5, to project into contact with the plate 82. As the wheel pivots to the straight-ahead transport position (FIG. 1), the hole 114 aligns with the shank axis of the pin 110, and the pin moves into the hole 114 to prevent pivoting of the plate 82 (which thereby prevents wheel castering). To release the wheel for normal castering action, the operator simply pulls the pin 110 up against the bias and rotates the handle to the position shown in FIGS. 4 and 5 wherein the handle rests in the shallow notch 126.

Figure 3:
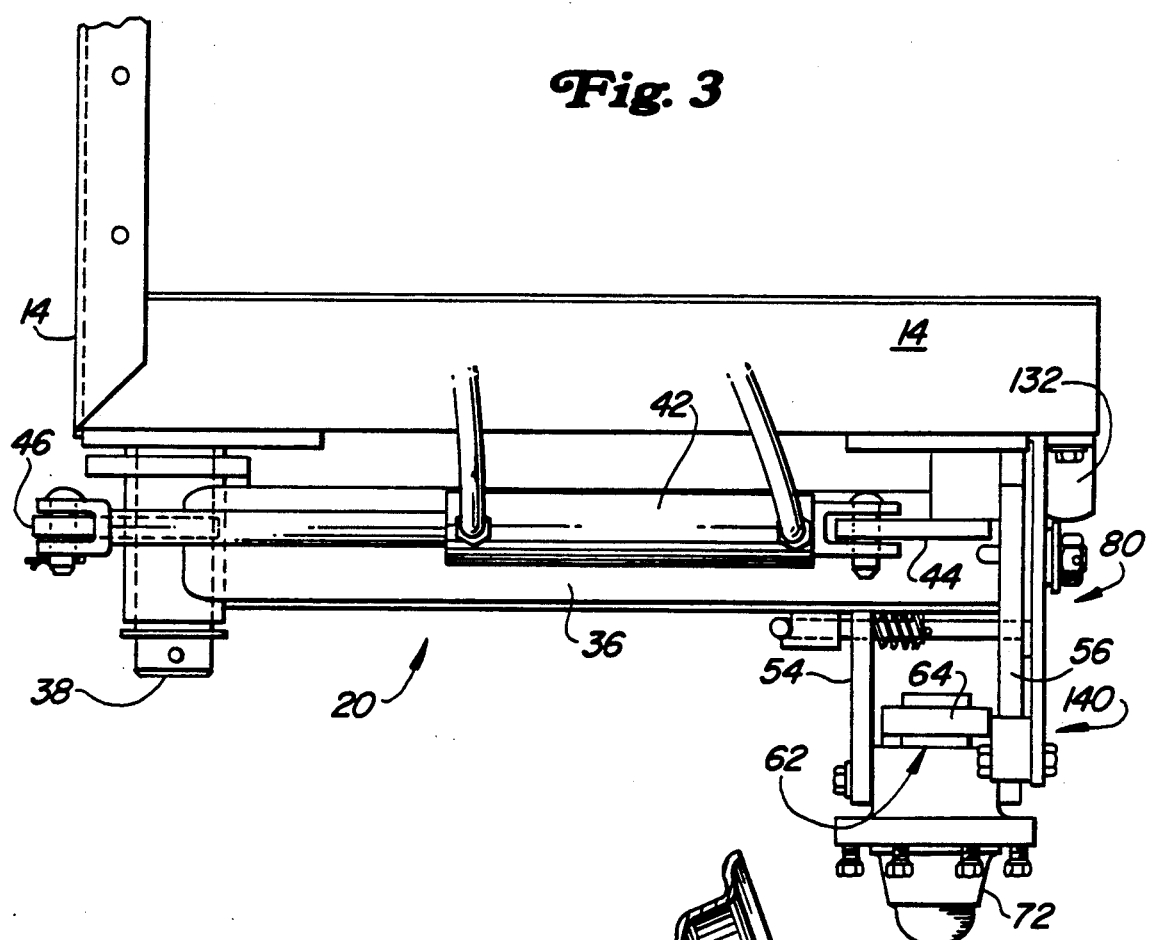
FIG. 3 is a top view of the castering structure of FIG. 2 in the raised field-working position.

Caster wheel position control upon raising of the wheel arm 36 is provided through the control assembly 80 utilizing a vertically adjustable angle bracket 132 having a slotted flange bolted to the frame 14. The plate 82 includes a round camming member 134 located at one corner. As the cylinder 42 is extended and the arm 36 is rocked upwardly toward the raised field-working position, the camming member 134 traverses a path which intersects a horizontal flange (FIG. 2) on the bracket 132. Continued rocking of the arm 36 upwardly to the final field-working position causes the bracket 132 acting against the camming member to pivot the plate downwardly so that the drag link 92 urges the wheel upwardly about the pivot 60 (which now assumes a generally horizontal position) against the pull of gravity. The position of the bracket 132 is selected such that the plane of the wheel 74 will be substantially vertical when the arm 36 is in the fully raised position (FIG. 3). An anti-rotation device 140 is connected to the frame 14 adjacent the bracket 132 by an adjusting bracket 142. The device 140 contacts and compresses the sidewall of the tire slightly to prevent wheel rotation when the arm 36 is raised and the wheel assumes the upright transport position under the control of the assembly 80.

The locations of wheel assemblies 20 and 22 with wheels that caster and wheel assemblies 18 and 24 with wheels that do not caster are selected to give an optimum balance between maneuverability and transport stability. As best seen in FIGS. 6a-6d wherein the castered wheels are shown shaded, the forwardmost assembly in the towed arrangement is a caster wheel assembly 20. The two unit arrangement of FIG. 6a has only one caster wheel assembly. The second wheel assembly in towed arrangements with three or more units 12 (FIGS. 6b–6d) is a caster wheel assembly 22. When two or three units 12 are being towed, the remaining wheel assemblies are non-castering assemblies 18 and 24. The leading caster wheel assemblies 20 and 22 significantly reduce side loads and tire scuffing While the remaining non-castering wheels on the two or three trailing implements lend stability to the gang. To increase maneuverability of the gangs of implements with five or more units 12 (FIG. 6d) the trailing wheel assembly is a caster wheel assembly 22. During turns, the gang rotates about the central non-castering wheel assemblies 18 and 24, and these central assemblies provide lateral stability during transport. In gangs of six or more units 12 (not shown) one additional caster wheel assembly 20 is provided between the wheel assembly 24 on the rear unit 12 and the wheel assembly 22 on the forward unit 12, preferably at the forward end of the third unit in the gang, for increased maneuverability.

Having described the preferred embodiment, it will become apparent that various modifications can be made without departing from the scope of the invention as defined in the accompanying claims.

We claim:

1. In a wide agricultural implement adapted for towing forwardly through a field in a field-working position and in an endwise fashion for narrow transport, the implement having a plurality of transversely spaced lift wheel assemblies for raising and lowering the implement between transport and field-working positions and for facilitating endwise transport when the implement is raised, wherein the lift wheel assemblies include at least a first lift wheel arm, a caster wheel including a wheel spindle assembly, pivot means connecting the wheel spindle assembly to the arm for rocking about an upright axis to prevent side loading on the arm and wheel when the implement is turned while in the endwise transport position, the pivot means including hinge structure connecting the lower end of the arm with the wheel spindle assembly closely adjacent the center of the wheel, a caster control assembly including a control member pivotally connected to the arm and to the wheel spindle assembly for rocking with the spindle assembly, means for contacting the control member for limiting free castering of the wheel, and wherein the pivot means hinge structure includes a first hinge portion connected to the lower end of the arm, and the wheel spindle assembly includes a wheel spindle and a second hinge portion fixed to and closely adjacent to the wheel spindle and means pivotally connecting the hinge portions, and wherein the caster control assembly includes a drag link pivotally connected at one end to the control member and at the opposite end to the second hinge portion.

2. The invention as set forth in claim 1 wherein the means for contacting the control member includes a Bellville washer for limiting wheel shimmy.

3. The invention as set forth in claim 2 wherein the means for contacting the control member further includes a locking member movably mounted on the arm and selectively moveable into locking relationship with the control member to secure the wheel against pivoting.

4. The invention as set forth in claim 3 wherein the locking member includes pin means for selectively locking the wheel against rocking about the upright axis.

5. In a wide agricultural implement adapted for towing forwardly through a field in a field-working position and in an endwise fashion for narrow transport, the implement having a plurality of transversely spaced lift wheel assemblies for raising and lowering the implement between transport and field-working positions and for facilitating endwise transport when the implement is raised, wherein the lift wheel assemblies include at least a first lift wheel arm, a caster wheel including a wheel spindle assembly, pivot means connecting the wheel spindle assembly to the arm for rocking about an upright axis to prevent side loading on the arm and wheel when the implement is turned while in the endwise transport position, the pivot means including hinge structure connecting the lower end of the arm with the wheel spindle assembly closely adjacent the center of the wheel, a caster control assembly including a control member pivotally connected to the arm and to the wheel spindle assembly for rocking with the spindle assembly, means for contacting the control member for limiting free castering of the wheel, and wherein the means for contacting the control member includes means responsive to the lowering of the implement to the field-working position for urging the control member to a preselected position to thereby limit castering of the wheel when the implement is in the field-working position.

6. The invention as set forth in claim 5 wherein the upright axis, when the wheel is in the field-working position, assumes a generally horizontal position and wherein the contact means prevents rocking of the wheel downwardly from a preselected position about the axis.

7. The invention as set forth in claim 5 wherein the means for contacting the control member further includes pin means for securing the control member in a preselected location when the implement is in the transport position.

8. The invention as set forth in claim 7 wherein the control member includes an apertured portion and the pin means is spring-biased and has a release position wherein the pin means projects into the aperture for automatic locking of the wheel against rotation about the upright axis.

9. The invention as set forth in claim 5 further including friction means for contacting the control member to limit shimmying of the wheel during transport.

10. The invention as set forth in claim 9 further including stop means connected to the arm for contacting the control member and restricting rocking of the wheel about the axis beyond a preselected angle.

11. In a framed agricultural implement adapted for towing forwardly through a field in a field-working position and in an endwise fashion for narrow transport, the implement having a plurality of transversely spaced lift wheel assemblies for raising and lowering the implement between transport and field-working positions and for facilitating endwise transport when the implement is raised, wherein the lift wheel assemblies include at least one lift wheel arm located adjacent one end of the implement in the field-working position and having a rotatable transport wheel with a centerline and a concave wheel portion, means for connecting the arm tot he implement fame for rocking about a fore-and-aft extending axis between ground-engaging and raised positions, and caster means located substantially in the concave wheel portion and connecting the wheel to the arm for rocking about an upright caster axis closely adjacent the centerline in castering fashion when the arm is in the ground-engaging position to prevent side loading on the arm and wheel when the implement is turned while in the endwise transport position, the caster means comprising a bracket connected to the arm for rocking therewith, a wheel spindle pivotally connected t the bracket for rocking with respect to the arm about the caster axis, and a caster lock for selectively preventing castering of the wheel, the caster lock including a plate pivotally connected to the arm and means connecting the plate for rocking with the wheel spindle, wherein the upright caster axis approaches a generally horizontal position as the arm rocks to the raised position, and further including contact means located on the frame for contacting the plate and limiting downward rocking of the wheel about the caster axis when the arm is raised.

12. The invention as set forth in claim 11 wherein the contact means includes bracket structure for camming the plate to a preselected position thereby rocking the wheel to a corresponding preselected position.

13. The invention as set forth in claim 12 further including means for limiting rotation of the wheel when the arm is raised including a wheel bracket located on the frame adjacent the contact means, wherein the side of the wheel in the preselected position contacts the wheel bracket.

14. The invention as set forth in claim 11 wherein the means connecting the plate includes a drag link connected between the wheel spindle and the plate.

15. The invention as set forth in claim 11 wherein the pivoting plate is connected for rocking about an axis parallel to the caster axis.

16. The invention as set forth in claim 11 including pin means selectively engageable with the plate for locking the plate against rotation to prevent castering of the wheel.

17. The invention as set forth in claim 11 further including means for limiting shimmying of the wheel during transport including a Bellville washer located at the pivotal connection of the plate to the arm.

18. In a wide agricultural implement including two or more units adapted for towing forwardly through a field in a field-working position and in an endwise fashion for narrow transport, the implement having a plurality of transversely spaced lift wheel assemblies for raising and lowering the units between transport and field-working positions and for facilitating endwise transport of the units when raised, wherein the lift wheel assemblies include a castering lift wheel assembly having an arm and a caster wheel rockable about an upright axis to prevent side loading on the arm and wheel when the implement is turned while in the endwise transport position, and a non-castering lift wheel arm assembly having a non-castering wheel, a method of attaching the lift wheel assemblies in preselected combinations dependant upon the number of units being towed, comprising:

(a) determining the number of units being towed;

(b) attaching a single castering lift wheel assembly to the leading end of the towed arrangement and providing noncastering lift wheel assemblies for the remaining lift wheel assemblies if the number determined in step (a) is two;

(c) attaching two castering lift wheel assemblies to the leading end of the towed arrangement and providing non-castering lift wheel assemblies for the remaining lift wheel assemblies if the number determined in step (a) is three or four; and (d) attaching two castering lift wheel assemblies to the leading end of the towed arrangement and a single castering lift wheel assemblies to the trailing end of the towed arrangement, and providing non-castering lift wheel assemblies for the remaining lift wheel assemblies if the number determined in step a) is five.

19. The invention as set forth in claim 18 further including the following step:

(e) attaching two castering lift wheel assemblies to the leading end of the towed arrangement and a single castering lift wheel assembly to the trailing end of the towed arrangement and a single castering lift wheel assembly centrally between and offset from the leading and trailing lift wheel assemblies, and providing non-castering lift wheel assemblies for the remaining lift wheel assemblies if the number determined in step (a) is six or more.

* * * * *